United States Patent
Trivedi et al.

(10) Patent No.: US 7,172,699 B1
(45) Date of Patent: Feb. 6, 2007

(54) ENERGY EFFICIENT WASTEWATER TREATMENT FOR NITROGEN AND PHOSPHORUS REMOVAL

(75) Inventors: Hiren K. Trivedi, Cedar Park, TX (US); James Porteous, Austin, TX (US)

(73) Assignee: Eimco Water Technologies LLC, Salt Lake City, UT (US)

( * ) Notice: Subject to any disclaimer, the term of this patent is extended or adjusted under 35 U.S.C. 154(b) by 219 days.

(21) Appl. No.: 10/909,104

(22) Filed: Oct. 13, 2004

(51) Int. Cl.
*C02F 3/30* (2006.01)

(52) U.S. Cl. ............... 210/605; 210/210; 210/623; 210/630; 210/903; 210/906; 210/259

(58) Field of Classification Search ........... 210/605, 210/610, 620, 621, 623, 630, 903, 906, 252, 210/259
See application file for complete search history.

(56) References Cited

U.S. PATENT DOCUMENTS

| | | | |
|---|---|---|---|
| 3,709,364 A | 1/1973 | Savage | |
| 3,733,264 A | 5/1973 | Spector et al. | |
| 3,864,246 A | 2/1975 | Casey et al. | |
| 3,964,998 A | 6/1976 | Barnard | |
| 3,977,965 A | 8/1976 | Tholander et al. | |
| 3,994,802 A | 11/1976 | Casey et al. | |
| 4,042,493 A | 8/1977 | Matsch et al. | |
| 4,051,039 A | 9/1977 | Heaney | |
| 4,056,465 A | 11/1977 | Spector | |
| 4,141,822 A | 2/1979 | Levin et al. | |
| 4,159,945 A | 7/1979 | Savage | |
| 4,162,153 A | 7/1979 | Spector | |
| 4,183,808 A | 1/1980 | Drnevich | |
| 4,257,897 A | 3/1981 | Krichten et al. | |
| 4,271,026 A | 6/1981 | Chen et al. | |
| 4,488,967 A | 12/1984 | Block et al. | |
| 4,488,968 A | 12/1984 | Hong et al. | |
| 4,522,663 A | 6/1985 | Ovshinsky et al. | |
| 4,522,722 A | 6/1985 | Nicholas | |
| 4,556,491 A | 12/1985 | Spector et al. | |
| 4,650,585 A | 3/1987 | Hong et al. | |
| 4,867,883 A | 9/1989 | Daigger et al. | |
| 4,874,519 A | 10/1989 | Williamson | |
| 4,956,094 A | 9/1990 | Levin et al. | |
| 5,281,335 A * | 1/1994 | Kuhn | 210/605 |
| 5,304,308 A * | 4/1994 | Tsumura et al. | 210/614 |
| 5,906,746 A | 5/1999 | Helmo et al. | |
| 6,290,849 B1 * | 9/2001 | Rykaer et al. | 210/605 |
| 6,712,970 B1 | 3/2004 | Trivedi | |
| 6,743,362 B1 * | 6/2004 | Porteous et al. | 210/605 |
| 2003/0042199 A1 * | 3/2003 | Smith | 210/605 |
| 2004/0000517 A1 * | 1/2004 | Austin et al. | 210/602 |

FOREIGN PATENT DOCUMENTS

JP 61-185394 * 8/1986

* cited by examiner

*Primary Examiner*—Fred G. Prince
(74) *Attorney, Agent, or Firm*—Thomas M. Freiburger

(57) ABSTRACT

In a wastewater treatment plant, the liquid side of the plant has preferably four stages for nitrification and/or denitrification, prior to further treatment such as a clarifier. Energy requirements are reduced by reducing aeration requirements. Four or more tanks/zones comprise serial anoxic and aerobic stages, but in the anoxic stages simultaneous nitrification/denitrification takes place in accordance with the known process of U.S. Pat. No. 5,906,746. By this arrangement the system can achieve a volume ratio of about 20% aerobic tankage to the total tankage volume, as compared to a much higher ratio in a typical prior art system of serial aerobic/anoxic stages, and greatly reducing aeration requirements.

20 Claims, 3 Drawing Sheets

ENERGY EFFICIENT WASTEWATER TREATMENT FOR NITROGEN AND PHOSPHORUS REMOVAL

BACKGROUND OF THE INVENTION

This invention concerns sewage treatment plants and processes, and in particular relates to an enhancement in the water side or liquid side of a wastewater treatment plant, resulting in reduced aeration requirements.

Currently, biodegradation of nitrogen-containing material in wastewater purification processes, e.g. activated sludge systems, is carried out in two or more stages. Typically the first stage is for denitrification under anoxic conditions (dissolved oxygen concentration=0 ppm) and the second stage is for nitrification under aerobic conditions (dissolved oxygen concentration>1 ppm). Usually aqueous medium containing microorganisms (referred to as "mixed liquor") is recycled from the aerobic stage to the anoxic stage. Sometimes, a second anoxic stage is used after the nitrification stage in order to achieve low levels of total nitrogen (<8.0 ppm). Alternatively, multiple anoxic and aerobic basins are used in sequential manner sometimes in order to avoid the need of mixed liquor recycle. Typical volume ratio between the anoxic and the aerobic stage is 25:75. The A/O, A2/O, BARDENPHO, PHOSTRIP, PHOSTRIP II, DENITE, BIO-DENITRO, VIP and BIONUTURE are some of the processes which are based on this principle and are currently in use. The following U.S. patents have been issued in this area: U.S. Pat. Nos. 4,159,945, 4,051,039, 3,709,364, 3,964,998, 3,733,264, 3,864,246, 3,994,802, 4,056,465, 4,162,153, 4,257,897, 4,271,026, 4,488,967, 4,488,968, 4,522,722, 4,522,663, 4,556,491, 4,650,585, 4,867,883, 4,042,493, 4,141,822, 4,183,808, 4,956,094, 4,874,519, 3,977,965.

Such prior systems thus either used a series of multiple sequential anoxic and aerobic stages, e.g. six or seven such sequential stages, to avoid the need for recycle from aerobic to anoxic basins, or the systems included sequential anoxic and aerobic stages, fewer in number but with recycle of mixed liquor from aerobic to anoxic, which typically involved a much greater recycle flow rate than the quantity of new wastewater flowing into the system. In either case, energy requirements were much higher than those of the present invention, due to recycle pumping requirements and/or large aeration requirements. The invention described below eliminates the need for recycle and achieves efficient biodegradation of nitrogen-containing wastewater in a highly efficient manner.

In a relatively new wastewater purification process, known as the SYMBIO process, nitrification and denitrification are combined in a single stage by maintaining oxygen concentration below 1.0 ppm. The SYMBIO process is described in U.S. Pat. No. 5,906,746, and also referred to in U.S. Pat. No. 6,712,970.

SUMMARY OF THE INVENTION

In the sewage treatment system and process of this invention, biodegradation of materials comprised of nitrogen-containing components is controlled in a manner that reduces tankage requirements, minimizes aeration requirements and eliminates the need for recycle in the denitrification/nitrification cycles. The system exists in the liquid side of a treatment plant, upstream of a clarifier or other subsequent treatment stage.

Degradation of the material is effected by microorganisms in an aqueous medium, as in sewage treatment. The method includes preferably four stages. In the first stage, called a simultaneous nitrification and denitrification stage, the oxygen concentration is maintained between about 0.05 and 0.95 ppm, whereas in the second and fourth stages, which are aerobic stages, the oxygen concentration is kept above 1.0 ppm, and may be above 2.0 ppm. The third stage is maintained at an oxygen level which may be 0.0 or a range up to about 0.95 ppm.

The method involves measurements and adjustments, preferably on-line, of process parameters in the first and sometimes the third stage, relating to the metabolic activity of the microorganisms. These adjustments are performed in such manner that dissolved oxygen is maintained below 1.0 mg per liter, creating conditions for simultaneous nitrification and denitrification (SNDN) in the same tank. The third stage may be maintained at zero oxygen concentration in order to achieve denitrification only, or it may be controlled to maintain nitrification/denitrification simultaneously in that tank as well. The second and fourth stages (aerobic stages) are designed to promote ammonia nitrification, i.e. ammonia in solution broken down into nitrate in solution.

External substrate (carbon source), e.g., methanol, can be added to the third stage to ensure complete denitrification in cases where the wastewater influent is limited by the available food (carbon) for the microorganisms.

Typical volume ratio among the four stages is about 65:10:15:10, for a total aerobic volume maintained under high oxygen concentration comprising only 20% of the total volume.

The four stage process achieves a high total nitrogen removal (nitrogen<8.0 ppm). No recycle of nitrate-rich mixed liquor from the second or the fourth stage is needed for denitrification. Because of the volume ratio of the four stages, and by operating at oxygen concentration below 1.0 ppm in the first and third stages, the method and system of the invention reduce energy consumption, thereby saving costs of wastewater purification. The high total nitrogen removal and reduced energy consumption result primarily from the maintenance of simultaneous nitrification/denitrification in one stage and optionally two stages.

If a clarifier is included in the system downstream of the described nitrogen removal stages, the only recycle on the liquid side of the plant is sludge recycle from the clarifier to the first simultaneous nitrification/denitrification stage.

Sometimes, membrane filters are used in the second aerobic stage for solid-liquid separation, instead of a clarifier. In this case, the last aerobic stage is known as a membrane bioreactor (MBR). The sludge is recycled from the MBR back to the first simultaneous nitrification/denitrification stage.

The invention in essence achieves a nitrogen removal result which is similar to the prior art system described above which has a long series of anoxic and aerobic stages, with elimination of mixed liquor recycle among the stages, which is also a feature of that prior system. The advantage over that system is primarily achieved by reducing aeration requirements, as well as tankage requirements.

In a variation of the invention described above, phosphorus removal is included in one or both of the simultaneous nitrification/denitrification stages, as described in U.S. Pat. No. 6,712,970, by monitoring and control of dissolved oxygen content in a manner that allows parts of flocs in the nitrification/denitrification to go anaerobic. U.S. Pat. No. 6,712,970 is incorporated herein by reference.

It is therefore among the objects of the invention to improve on prior processes for biodegradation of nitrogen and phosphorus-containing material in wastewater purification processes, by including one or more nitrification/denitrification stages with the aerobic tank volume ratio at about 20% of the total volume or lower, without recycle between stages and minimal aeration requirements. These and other objects, and common advantages and features of the invention will be apparent from the following description of a preferred embodiment, considered along with the drawings.

DESCRIPTION OF PREFERRED EMBODIMENTS

Figure 1:
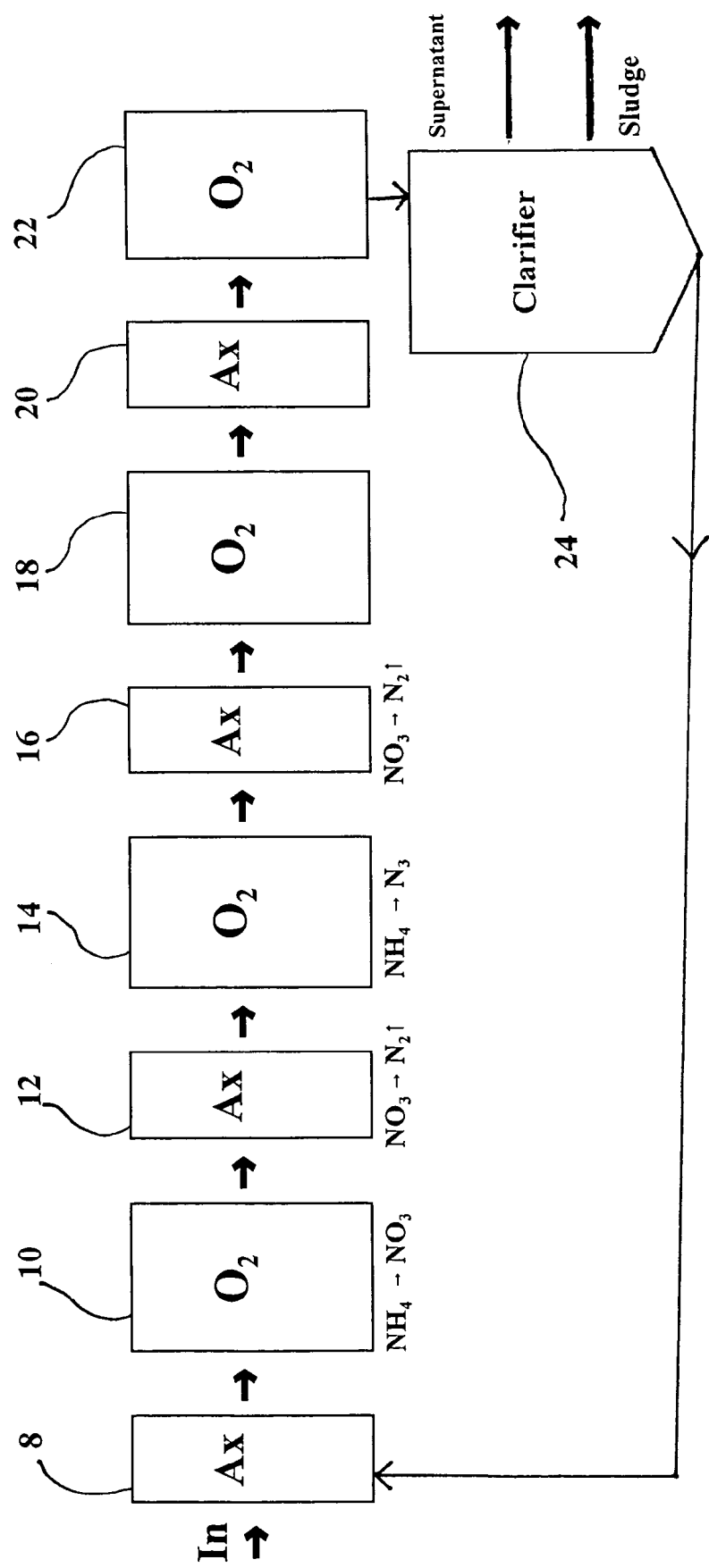
FIG. 1 is a schematic diagram showing a prior art liquid-side wastewater purification process in an activated sludge sewage treatment system.

In the drawings, FIG. 1 shows a prior art system as described above, wherein a series of sequential aerobic and anoxic stages 8, 10, 12, 14, 16, 18, 20 and 22 were included, beginning with an anoxic stage and ending with an aerobic stage. Such a system uses a large number of stages, typically six or more, to achieve a desired degree of nitrogen removal, without recycle among the stages. The last stage before secondary clarification, i.e. a clarifier 24, is aerobic (oxic), as is typical because if an anoxic stage is positioned just prior to the clarifier, this would introduce anoxic conditions in the sludge in the clarifier, which would cause nitrate to be converted into nitrogen gas in the clarifier, disturbing the settling process, and could also cause undesirable anaerobic conditions in the sludge, giving off methane gas. The reason for recycle of sludge (mixed liquor) from the clarifier 24 to the first stage 8 is to further reduce nitrogen in the sludge which ultimately exits the clarifier for further processing in the solids side of the plant. Nitrogen primarily in the form of nitrate is brought back to the start of the sequence of nitrification/denitrification stages. As generally and schematically (not to scale) indicated in FIG. 1, the aerobic stages (10, 14, 18 and 22) of the prior art system of FIG. 1 are much larger in volume than the anoxic stages (8, 12, 16, 20). In this type system the aerobic stages might occupy about 75% of the total volume of the eight nitrification/denitrification stages shown, thus causing high energy requirements for blowers.

Figure 2:
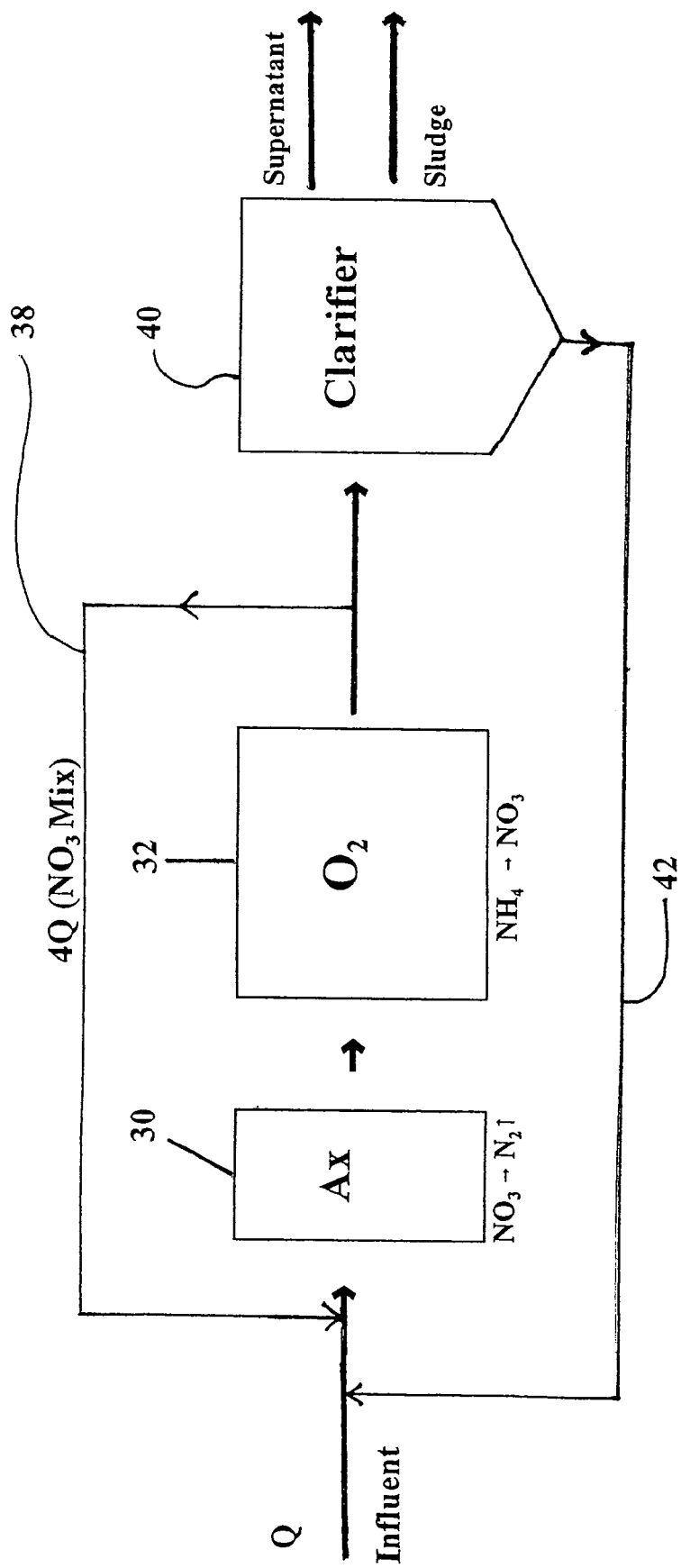
FIG. 2 is schematic diagram showing another example of a prior art liquid-side system, with fewer stages but with recycle of mixed liquor.

FIG. 2 shows another type of prior art liquid side denitrification arrangement as discussed above. Here, fewer stages are required, e.g. two as shown (30 and 32), alternating anoxic and aerobic in sequence. The same process occurs as in the system of FIG. 1. However, with these fewer stages denitrification is not nearly complete in a single pass, and a large-volume recycle is required. As indicated by the recycle arrow 38, recycle is from the downstream end of the last oxic stage 32 back to the first anoxic stage 30. Typically the flow rate of recycle would be about four times the influent rate (influent is shown as Q, and recycle at 4 Q). When the mixed liquor reaches a secondary clarification step, such as the clarifier 40 shown in FIG. 2, its nitrogen has been reduced perhaps as thoroughly as in the system of FIG. 1; again, sludge is recycled from the clarifier back to the first anoxic stage 30, indicated by the recycle arrow 42 in FIG. 2.

As in the system of FIG. 1, the aerobic stage or stages of this prior art system are much larger in volume than the anoxic stages. Aerobic volume might be about 75% of all the stages. Thus, blower energy requirements are high, and in addition, the large recycle requirement requires considerable additional energy.

Figure 3:
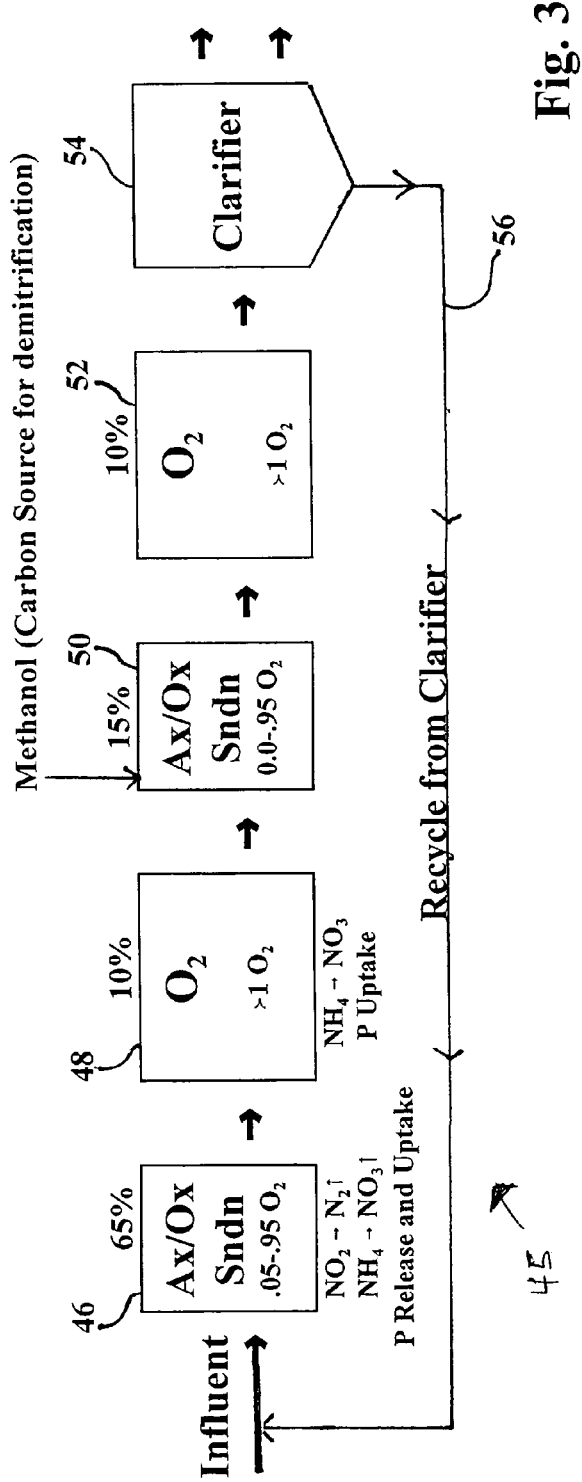
FIGS. 3 and 4 are schematic diagrams indicating a system according to the invention.

FIG. 3 shows an example of a system 45 according to the principles of this invention. In this case the denitrification cycle has four stages, simultaneous nitrification/denitrification stage 46, oxic stage 48, anoxic/simultaneous nitrification/denitrification stage 50 and oxic stage 52, in sequence generally as in the previously described system. Here, the largest stage 46 is a simultaneous nitrification/denitrification stage, and the smallest stage 52 is an aerobic stage. An example of volume distribution among the four stages is shown, at 65:10:15:10; thus, aerobic volume is about 20%. This ratio can vary; the first stage can be in the range of about 50% to 95% of total volume, and each of the rest from about 1% to 25%. The stages 46 and 50 are not purely anoxic, with the stage 46 and optionally also the stage 50 being simultaneous nitrification/denitrification zones such as described in U.S. Pat. Nos. 6,712,970 and 5,906,746, both of which are incorporated herein by reference. The stage 50 can be anoxic (0.0% oxygen) and not SNDN if desired. In the first simultaneous nitrification/denitrification stage 46, dissolved oxygen content is maintained essentially in the range of about 0.05 to 0.95 ppm. In the third stage, i.e. the second anoxic simultaneous nitrification/denitrification stage 50, dissolved oxygen content is maintained essentially in the range of about 0.0 to 0.95 ppm. By the principles of the '746 patent, simultaneous nitrification and denitrification are maintained in at least one of the stages 46 and 50, and preferably in both of these stages (SNDN in the drawing). A metabolic indicator of the microbes is monitored, to detect when the microbes near the centers of flocs in the wastewater turn anaerobic. At this point, in accordance with the principles of the '746 patent, aeration is increased to increase the level of dissolved oxygen such that the anaerobic condition is not allowed to develop. Oxygen content is allowed to rise, which may be to about 0.95 ppm dissolved oxygen in the tank, then is again limited. During this repeated sequencing, anoxic conditions exist in portions of the wastewater while aerobic conditions exist in other portions, and the balance of these conditions shifts as the oxygen level is adjusted. Denitrification, i.e. the breakdown of nitrates to give off nitrogen gas, occurs in the anoxic state as the microbes consume oxygen from the nitrates. Nitrification, i.e. the breakdown of ammonia into nitrate and water, occurs in the aerobic or oxic state. Denitrification and nitrification thus occur simultaneously within a single tank, and the largest tank 46 in the system 45 of the invention removes a considerable portion of the nitrogen from the biomass.

Optionally, the simultaneous nitrification/denitrification process is maintained also in the smaller tank 50, the third stage of the system 45, for further efficiency in the removal nitrogen.

Immediately downstream of the simultaneous nitrification/denitrification stage 46 is the small aeration stage 48, where dissolved oxygen is maintained at greater than 1 ppm, and preferably greater than 2 ppm. Further breakdown of ammonia occurs, producing nitrate. In the second anoxic/simultaneous nitrification/denitrification stage 50, also a small-volume tank for shorter detention time, nitrates are broken down to release nitrogen gas, and optionally simultaneous nitrification/denitrification can be maintained, as in the tank 46. If the external food supplied by the wastewater constituents is not sufficient, the extent of denitrification achieved in stage 50 may be limited. In this case, external substrate such as methanol can be added to the stage 50. In the final stage 52, dissolved oxygen is again maintained at greater than 1 ppm, and preferably greater than 2 ppm. This is a "post-aeration" stage, at a short detention time, necessary for reasons explained above relative to the condition of the mixed liquor as it is sent to a clarifier 54. Thus, the mixed liquor as sent to the clarifier has been greatly reduced in nitrate and is in the aerobic state, with some nitrate present. Sludge recycle is effected from the clarifier, as discussed above and as shown by the recycle arrow 56.

It should be understood that all stages can be either in separate tanks or in separate compartments or zones within a single tank, separated by either baffles or internal walls. In a variation of the above, the system of FIG. 3 is enhanced to include phosphorus removal as in U.S. Pat. No. 6,712,970. In the large simultaneous nitrification/denitrification tank 46, and optionally also in the second anoxic/simultaneous nitrification/denitrification tank 50, the metabolic activity is monitored and is controlled in such a way as to allow the anaerobic condition to develop in the flocs to a pre-selected extent, thereby causing phosphorus to be released into the liquid. Instead of increasing oxygen at the instant the centers of flocs are determined to have turned to the anaerobic condition, this aeration action is delayed, either for a pre-selected period of time (which may be at least about one minute), or one or more metabolic indicators are monitored until a predetermined extent of the anaerobic condition is determined to have been reached, and then oxygen level is increased. As taught in the '970 patent, the anaerobic condition in the tank 46 causes release of phosphorus into the water, and when oxygen level is increased, this causes uptake of free phosphorus by the bacteria, so that phosphorus is bound in the sludge. If in the simultaneous nitrification/denitrification stage 46 the phosphorus uptake is not complete, as in U.S. Pat. No. 6,712,970, the phosphorus uptake further occurs in the subsequent aerobic stage 48. This is repeated in the further stages 50 and 52, if the stage 50 is maintained as a simultaneous nitrification/denitrification and phosphorus removal stage. Further phosphorus release and uptake occur with recycle of sludge from the clarifier to the first simultaneous nitrification/denitrification stage 46.

Figure 4:
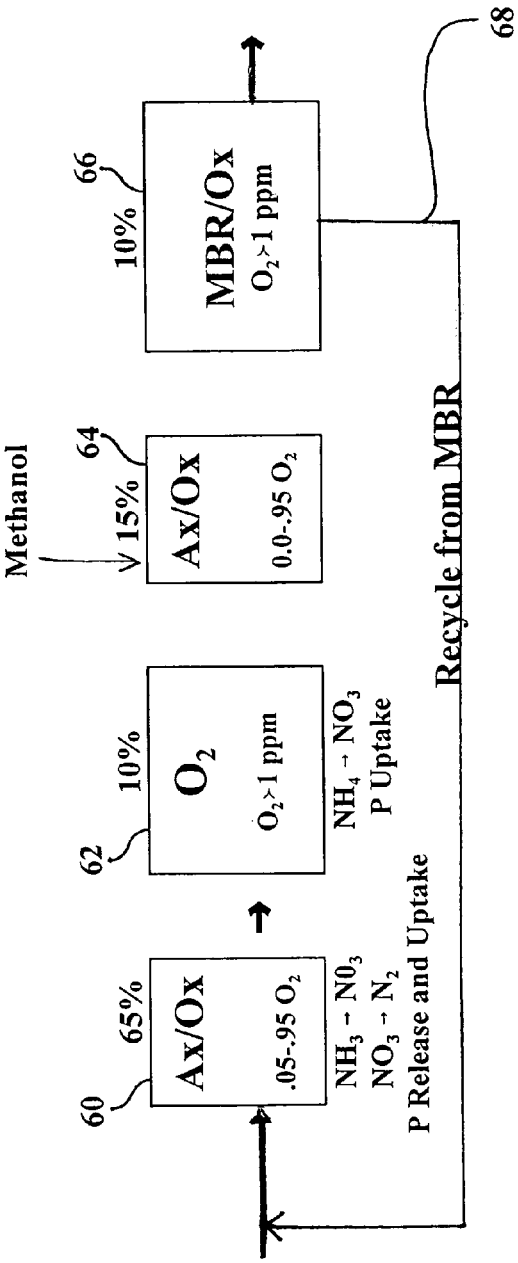

In another variation of the system shown in FIG. 3, as shown in FIG. 4, a series of stages 60, 62, 64 and 66 are included generally as in FIG. 3, but the second aerobic stage 66 incorporates membrane filters for separating sludge from the treated water. This stage is commonly known as the membrane bioreactor (MBR). Sludge is recycled from the MBR, at 68, to the first simultaneous nitrification and denitrification stage.

The above described preferred embodiments are intended to illustrate the principles of the invention, but not to limit its scope. Other embodiments and variations to this preferred embodiment will be apparent to those skilled in the art and may be made without departing from the spirit and scope of the invention as defined in the following claims.

We claim:

1. In a liquid side of a sewage treatment system for treating wastewater, a biological nutrient removal (BNR) configuration of high efficiency with minimal aeration requirements, comprising:
    at least four tanks or zones arranged for successive treatment of the wastewater, including simultaneous nitrification/denitrification, aerobic, anoxic and aerobic stages in sequence in the respective tanks or zones,
    a first simultaneous nitrification/denitrification stage being maintained essentially at less than 1 ppm oxygen, and with the oxygen level adjusted to maintain simultaneous nitrification/denitrification, so that ammonia is broken down to produce nitrate, and nitrate is broken down to release nitrogen gas, within a single tank or zone and simultaneously,
    a first aerobic stage being maintained essentially at greater than 1 ppm oxygen to promote nitrification,
    an anoxic stage after the first aerobic stage, being maintained essentially at less than 1 ppm oxygen, and with the oxygen level adjusted to maintain an anoxic condition at least in part of the wastewater or part of the time, to break down nitrate to release nitrogen gas, and
    a second aerobic stage being maintained essentially at greater than 1 ppm oxygen to promote nitrification.

2. The system of claim 1, the system being without recycle of sludge from any of the four stages back to any previous stage.

3. The system of claim 2, in combination with a clarifier stage downstream of the nitrification/denitrification stages, and including recycle of sludge from the clarifier stage back to the first simultaneous nitrification/denitrification stage.

4. The system of claim 2, wherein the anoxic stage includes simultaneous nitrification/denitrification, so that ammonia is broken down to produce nitrate, and nitrate is broken down to release nitrogen gas, within a single tank or zone and simultaneously.

5. The system of claim 2, wherein the four stages comprise portions of the total volume of the four stages as follows: first stage, about 50% to 95%; second stage, about 1% to 25%; third stage, about 1% to 25%; and fourth stage, about 1% to 25%.

6. The system of claim 1, wherein the four nitrification and/or denitrification stages are in four separate tanks, and wherein the ratio of total volume of the aerobic stage tanks to total volume of all stages is about 1:5.

7. The system of claim 1, wherein the four stages are in four compartments or zones within a single tank, separated by either baffles or internal walls.

8. The system of claim 1, in combination with a membrane bioreactor positioned to remove clean water in lieu of a clarifier.

9. The system of claim 8, wherein the membrane bioreacter is incorporated in the second aerobic stage, and including recycle of sludge from the second aerobic stage back to the first simultaneous nitrification/denitrification stage.

10. The system of claim 1, wherein the simultaneous nitrification/denitrification stage includes means for releasing phosphorus in the wastewater by allowing an anaerobic condition to develop in the flocs to a pre-selected extent and thereby causing phosphorus to be released into the liquid, then adding dissolved oxygen to the aerobic/anoxic zone to effect recovery of at least some of the bacteria from the anaerobic condition and causing uptake of phosphorus, as well as effecting nitrification.

11. The system of claim 1, wherein the aerobic stages are maintained at greater than 2 ppm oxygen.

12. In a sewage treatment process, a method for high efficiency biological nutrient removal (BNR) for wastewater treatment, with minimal aeration requirements, comprising:
    providing at least four tanks or zones arranged for successive treatment of the wastewater, including simultaneous nitrification/denitrification, aerobic, anoxic and aerobic stages in succession in the respective tanks or zones, establishing a flow of wastewater through the stages in succession, maintaining the first simultaneous nitrification/denitrification anoxic stage substantially at less than 1 ppm oxygen, and adjusting the oxygen level to maintain simultaneous nitrification/denitrification, so that ammonia is broken down to produce nitrate, and nitrate is broken down to release nitrogen gas, within a single tank or zone and simultaneously, maintaining the first aerobic stage essentially at greater than 1 ppm oxygen to promote nitrification whereby ammonia is broken down to produce nitrate, maintaining the anoxic stage substantially at less than 1 ppm oxygen, and adjusting the oxygen level to maintain an anoxic condition at least in part of the wastewater or part of the time, to break down nitrate to release nitrogen gas, maintaining the second aerobic stage substantially at greater than 1 ppm oxygen to promote nitrification whereby ammonia is broken down to produce nitrate, and performing the above steps without recycle of sludge from any of the stages back to any previous stage.

13. The method of claim 12, wherein the anoxic stage is maintained as a second simultaneous nitrification/denitrification stage, with the oxygen level being adjusted to maintain simultaneous nitrification/denitrification, so that ammonia is broken down to produce nitrate, and nitrate is broken down to release nitrogen gas, within a single tank or zone.

14. The method of claim 13, further including, in one of the simultaneous nitrification/denitrification stages, allowing an anaerobic condition to develop in flocs within the tank to a pre-selected extent and thereby causing phosphorus to be released into the wastewater, and then adding dissolved oxygen to the simultaneous nitrification/denitrification stage to effect recovery of at least some of the bacteria from the anaerobic condition and causing uptake of phosphorus, as well as effecting nitrification, whereby in an aerobic stage downstream of said one simultaneous nitrification/denitrification stage, biological phosphorus uptake is enhanced, and whereby denitrification as well as phosphorus removal are effected in the at least four tanks or zones.

15. The method of claim 12, further including, in the first simultaneous nitrification/denitrification stage, allowing an anaerobic condition to develop in flocs within the tank to a pre-selected extent and thereby causing phosphorus to be released into the wastewater, and then adding dissolved oxygen to the simultaneous nitrification/denitrification stage to effect recovery of at least some of the bacteria from the anaerobic condition and causing uptake of phosphorus, as well as effecting nitrification, whereby in an aerobic stage downstream of the simultaneous nitrification/denitrification stage, biological phosphorus uptake is enhanced, and whereby denitrification as well as phosphorus removal are effected in the at least four tanks or zones.

16. The method of claim 12, wherein the aerobic stages are maintained at greater than 2 ppm oxygen.

17. The method of claim 12, wherein the four tanks or zones for the four stages comprise portions of the total volume of the four stages as follows: first stage, about 50% to 95%; second stage, about 1% to 25%; third stage, about 1% to 25%; and fourth stage, about 1% to 25%.

18. The method of claim 12, further including removing liquid in a clarifier downstream of the second aerobic stage, and including recycle of sludge from the clarifier back to the first simultaneous nitrification/denitrification stage.

19. In a sewage treatment process, a method for high efficiency biological nutrient removal (BNR) for wastewater treatment, with minimal aeration requirements, comprising:

providing at least four tanks or zones arranged for successive treatment of the wastewater, including simultaneous nitrification/denitrification, aerobic, anoxic and aerobic stages in succession in the respective tanks or zones, establishing a flow of wastewater through the stages in succession, maintaining the first simultaneous nitrification/denitrification anoxic stage substantially at less than 1 ppm oxygen, and adjusting the oxygen level to maintain simultaneous nitrification/denitrification, so that ammonia is broken down to produce nitrate, and nitrate is broken down to release nitrogen gas, within a single tank or zone and simultaneously, maintaining the first aerobic stage essentially at greater than 1 ppm oxygen to promote nitrification whereby ammonia is broken down to produce nitrate, maintaining the anoxic stage substantially at less than 1 ppm oxygen, and adjusting the oxygen level to maintain an anoxic condition at least in part of the wastewater or part of the time, to break down nitrate to release nitrogen gas, maintaining the second aerobic stage substantially at greater than 1 ppm oxygen to promote nitrification whereby ammonia is broken down to produce nitrate, and removing clean water with a membrane bioreacter positioned at the end of the stages.

20. The method of claim 19, wherein the membrane bioreacter is incorporated in the second aerobic stage, and including recycling sludge from the second aerobic stage back to the first simultaneous nitrification/denitrification stage.

* * * * *